Marvin R. Jones
INVENTOR.

Sept. 11, 1962  M. R. JONES  3,052,943
WEDGE-TYPE SUPPORT
Filed July 17, 1959  2 Sheets-Sheet 2
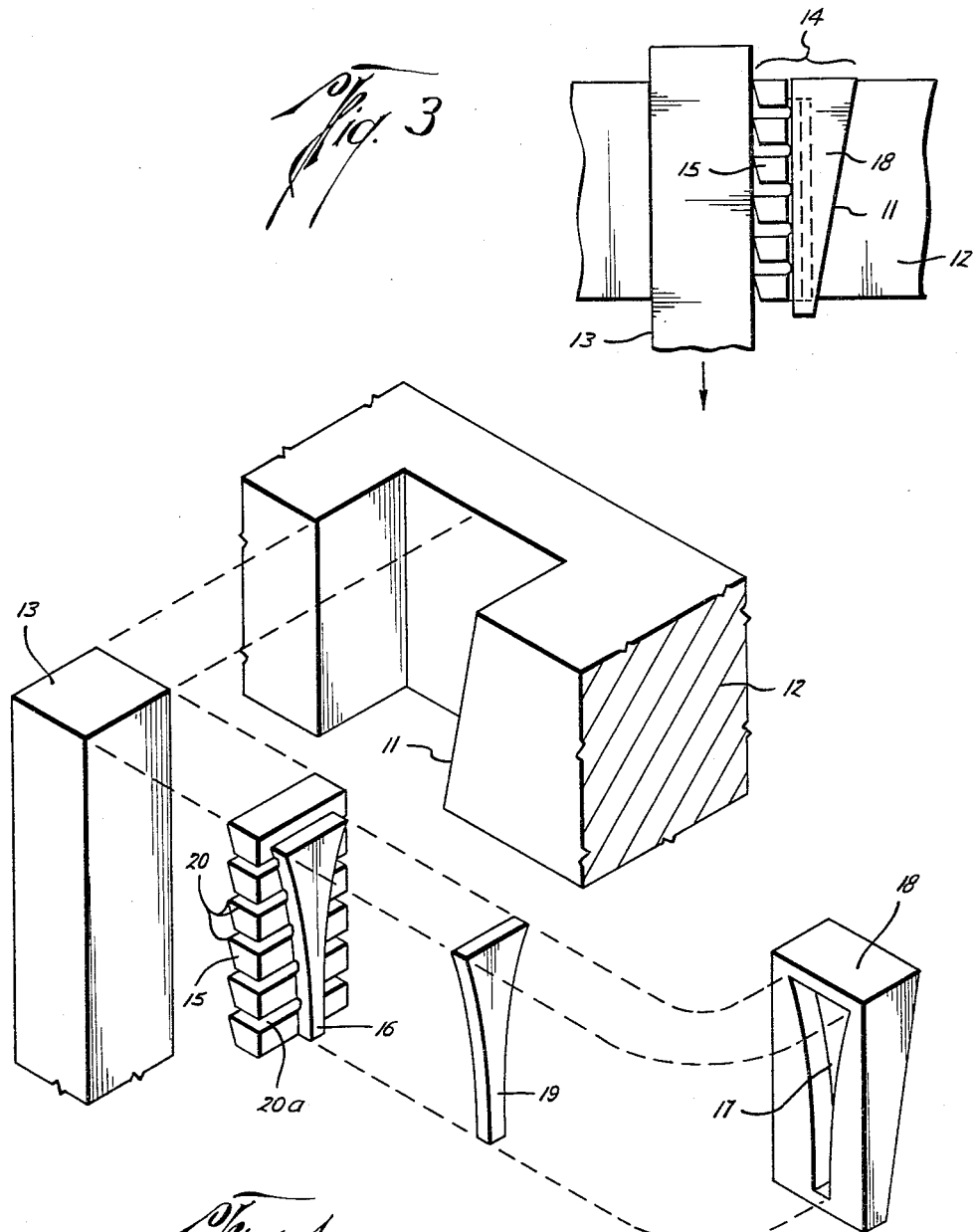
Marvin R. Jones
INVENTOR.
BY
ATTORNEYS United States Patent Office 3,052,943
Patented Sept. 11, 1962

3,052,943
WEDGE-TYPE SUPPORT
Marvin R. Jones, Houston, Tex., assignor to Cameron Iron Works, Inc., Houston, Tex., a corporation of Texas
Filed July 17, 1959, Ser. No. 827,815
8 Claims. (Cl. 24—263)

This invention relates to a wedge-type support of the sort which is adapted to engage a tapered converging seat in one member and the outer surface of a second member to support the second member against displacement in the converging direction of the seat. After such a wedging support engages the members, frictional forces acting between the wedge support and the supported member increase the gripping forces of the wedge support against the supported member in proportion to increases in such displacing forces, so as to automatically energize the wedge.

Such wedge-type supports frequently are provided for supporting members having substantial lengths of relatively uniform cross section. Such members include rods, bars, and tubes, such as pipes supported in wells and the like. The wedge-type supports for such members act by being forced into gripping engagement with the outer surface thereof through reaction from the engagement of the wedge-type support with the tapered seat in the first member.

One of the most common applications of such wedge-type supports is for the support of tubes or pipes in wells. In this, wedges known as "slips" are located between the pipe and the interior of a downwardly tapering opening forming a converging seat in a support structure commonly known as a casing head or a tubing head. Such casing or tubing head is located at the upper end of the well and the suspended pipe passes through the opening. These slips are segmental and have inner surfaces shaped to conform to the outer surface of the pipe and are provided with circumferentially extending teeth on their inner surfaces to bite into the pipe and prevent it from sliding downwardly with respect to the slips.

Gripping forces produce stresses within supported members which combine with stresses produced by the displacing force in a wedge-type support of the character to which this invention relates. Quite often the resultant stress value exceeds both of the component values and thereby limits the value of the displacing force that the wedge can support without damaging the supported member.

When displacing force produces a longitudinal tensile stress in the supported member, that stress decreases from a maximum value at some point near the small end of the wedge to a minimum value at some point near the large end. When the displacing force produces a longitudinal compressive stress in the supported member, that stress decreases from a maximum value at some point near the large end of the wedge to a minimum value at some point near the small end.

In the case of a pipe or tube suspended in a well, when loads suspended reach some maximum level, the crushing component of the force applied to the pipe by such wedge-type support or "slip" produces a circumferential or tangential compressive stress which combines with the axial tensile stress induced in the pipe by its suspended weight to swage the pipe and cause failure. Loads substantially lower than the maximum tensile strength of the pipe cause these slips to crush the pipe.

This invention has for one object the provision of means for distribution of forces along the gripping surface of a supporting wedge according to a predetermined pattern.

It has for another object the provision of a wedging means energized by frictional engagement with a supported member, which distributes the gripping force in a predetermined manner along the length of its contact with the supported member so that the combined stress resulting from gripping forces and displacing forces remains substantially constant in the portion of the supported member coextensive with the wedge.

In the pipe or tube suspension, for example, since a combination of stresses causes the pipe failure, and since two principal stresses produce the most of this combined stress, the proposed structure loads the pipe in such a manner that this combined stress will be substantially equal over the area of contact between slip and pipe.

Each tooth carries a maximum vertical load proportional to the horizontal component of its force against the pipe. Below the bottom tooth, the pipe load in tension equals the entire suspended weight. Just above the bottom tooth, the load equals the suspended weight less whatever the bottom tooth supports. As the tensile load decreases by the amount supported by each succeeding tooth it approaches zero toward the end of the slip.

Other objects and advantages of this invention will become apparent from the following description taken in connection with the accompanying drawings in which are set forth certain preferred embodiments of this invention by way of illustration and example.

In the drawings:

FIG. 3 is a fragmentary perspective of a modification illustrated as supporting a solid bar in a tapering notch in the side of a support member such as a plate or the like.

FIG. 4 is an exploded view of the structure illustrated in FIG. 3 showing the component parts of the wedge-type support together with the support plate and the supported bar and illustrating the manner in which they may be fitted together in use.

The objects of this invention are accomplished in the illustrated examples by the combination with a wedge of a means for urging its gripping surface against the supported member with a force which varies from a predetermined minimum at that end of the wedge closest to the application of the longitudinal force to the supported member to a maximum at the opposite end of the wedge. Preferably, this variation is by increments predetermined so as to combine with the varying longitudinal stress in the supported member from end to end of the wedge and produce an approximately uniform total stress in a supported member from end to end of the wedge. Specifically, in the examples given, a wedge of approximately uniform gripping face width from end to end and relatively flexible about its transverse and inflexible about its longitudinal axis, is urged against the supporting member by a body of quasi-liquid having approximately uniform unit pressure throughout but acting on an area of the wedge varying in width from end to end of the wedge.

Figure 1:
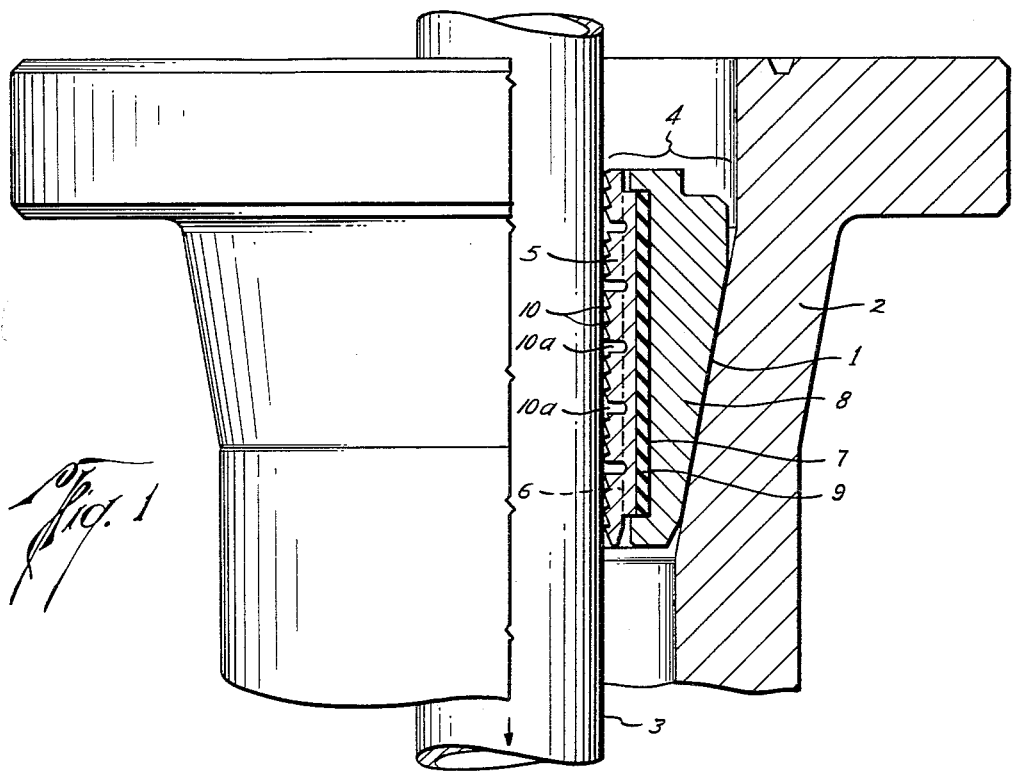
FIG. 1 is a view partly in elevation and partly in longitudinal cross section through the upper portion of a well-head having a pipe suspended therein by a wedge-type support constructed in accordance with this invention, the support being shown in longitudinal cross section in this view.

Referring now to FIG. 1 of the drawing, there is shown an annular converging seat 1 in a body of a supporting member 2 such as a casing head or tubing head of a well. The supported member 3 is a tubular member such as a well casing or tubing, concentric with the seat 1 and supported on it by a number of wedge segments 4 each forming a part of an annulus.

Each of the segments 4 consists of three parts. A friction, or gripping face part 5 contoured to engage the member 3 has considerable flexibility in planes containing the axis of the tube while remaining relatively much more rigid in planes normal to that axis. That is, the part 5 will flex readily along lines parallel to the axis of the tubular member, but will be relatively inflexible along lines perpendicular to this axis and across the width of the wedge. A boss 6 on the part 5 extends into a corresponding recess 7 on a seat engaging part 8 to engage a resilient relatively deformable part 9 carried in the recess. This part 9 is formed of a material such as rubber which will flow under pressure and hence may be referred to as a quasi-liquid because of the characteristics of liquid which it exhibits under pressure. One of these characteristics is that of exerting a substantially equal pressure in all directions when confined and placed under pressure.

The width of the boss 6, the width of the recess 7, and the width of the deformable part 9 varies along the length of the assembly. The small deformation of the part 9 will accommodate surface irregularity and variation in strain along the supported member. As a result, the pressure throughout the part 9 will be very nearly uniform under pressure. Thus, the force applied to a unit of length of the parts 5 and 8 by the part 9 under pressure becomes a direct function of the mean width of the boss at that particular unit of length.

Figure 2:
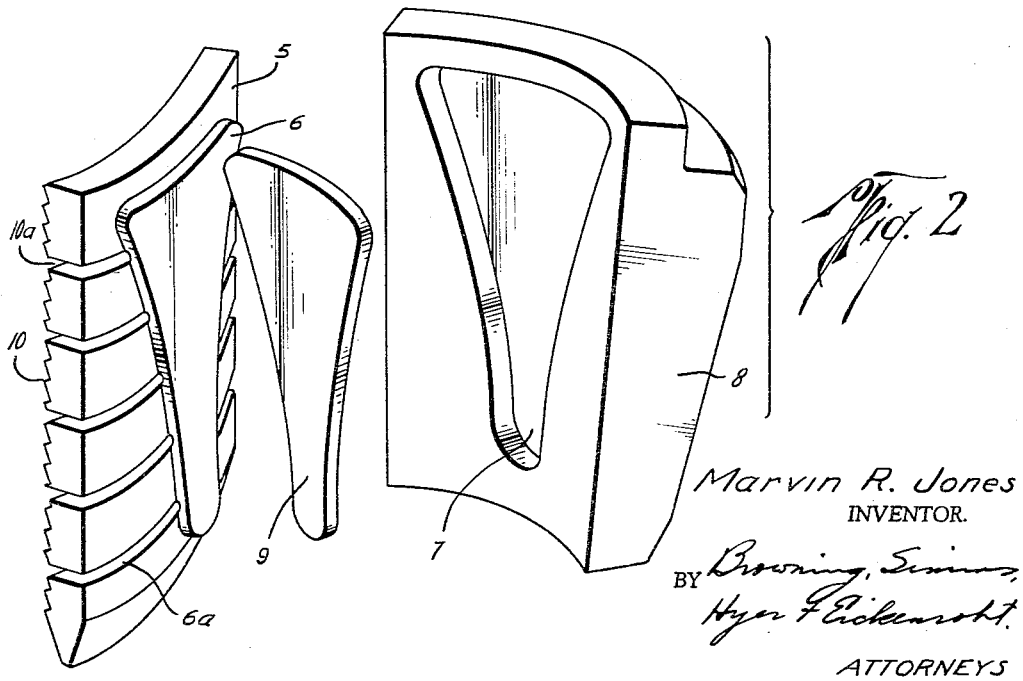
FIG. 2 is an exploded view of one of the composite wedges forming part of the wedge-type support for supporting a pipe in the manner illustrated in FIG. 1.

FIG. 2 shows a developed view of the boss 6 on the part 5 as illustrated in FIG. 1. This particular pattern gives at any point along the contact between the wedge 4 and the supported member 3 a gripping force producing a lateral compressive stress within the supported member which combines with the tensile stress produced by a tensile displacing force to give a resulting stress substantially equal to that of other points along the contact.

As above noted, the part 5 is substantially inflexible about its longitudinal axis but is quite flexible about a transverse axis. That is, it will not flex or bend along bending or hinge axes transverse to the crests of the teeth 10 but will flex much more readily along bending or hinge axes parallel to the crests of teeth 10. This result is accomplished in the illustration in the drawing by providing between and parallel to the crests of certain of the gripping teeth 10 which are adapted to engage the pipe 3 channels 10a which extend from the face on which the teeth 10 are mounted in a radially outward direction. These channels weaken the member 5 in a direction to permit it to flex about transverse axes or axes parallel to the crests of teeth 10 and thereby to apply various pressures to the pipe at points spaced longitudinally along the pipe. The normal rigidity and resistance to flexing of the part 5 along bending or hinge lines parallel to the pipe axis and transversely of the crests of teeth 10 is retained by virtue of the fact that no channels are provided in such direction and hence the member remains unweakened in such direction.

In operation of the device illustrated in FIGS. 1 and 2, the pipe 3 is lowered into place within the wellhead 2 until it reaches a location at which it is to be suspended from the wellhead. Then a number of the wedge assemblies illustrated in FIG. 2 sufficient to provide a very nearly complete annulus are lowered into place between the tapered seat 1 in the wellhead and the outer surface of the pipe 3. A downward load on the pipe in the direction of the arrow in FIG. 1 carries such assemblies downward by virtue of the frictional engagement of the pipe with the teeth 10, and such downward movement causes a wedging engagement between the seat engaging part 8 and the seat 1 urging the assembly as a whole radially inward toward the longitudinal axis of the pipe. This force will cause the teeth 10 to bite into the pipe and prevent the pipe from moving longitudinally with respect to the teeth so that the teeth may provide the support for the pipe against such longitudinal movement. However, the force with which the teeth 10 are caused to engage the pipe will be only such as is applied by the quasi-liquid member 9 which is relatively deformable acting on the boss 6 of the part 5. Since the relatively deformable member 9 is such as to exert substantially equal unit pressure in all directions while transmitting such a force, the total pressure which it will exert upon the boss 6 for any given increment of length will depend upon its mean width over such increment of length. Thus the forces exerted on the respective teeth 10 to provide a compressive action on the pipe will, in the example illustrated, vary from a minimum for the lower of these teeth to a maximum for the uppermost thereof. Inasmuch as the tensile stress on the pipe over the longitudinal extent of the slip varies from a maximum at the lower end to zero at the upper end, it will be seen that the greatest compressive force upon the pipe due to the slip action will occur at the point of the least tensile force on the pipe, whereas at the point where the greatest tensile force on the pipe is exerted at the lowermost tooth, the least compressive stress on the pipe is exerted by that tooth.

It is within the concept of this invention to so vary the width of the relatively deformable element 9 that any desired distribution of forces to the pipe in a longitudinal direction may be accomplished.

Referring now to FIGS. 3 and 4, there is illustrated a form of the invention in which a square bar is gripped in a one-sided seat. The purpose of the illustration of this form is to demonstrate the fact that this invention in its broader aspect is not limited to the suspension of tubular members within other tubular members nor to any cross-sectional shape of suspension.

In the last-mentioned form an inclined seat 11 which may be a plane surface is formed as one side of a notch in a support plate or bar 12. This notch is made wide enough to receive the elongated bar 13 which is, in this instance, the supported member.

The composite wedge segments 14 are, as before, formed of friction or gripping face parts 15 contoured to engage the supported member 13 and having considerable flexibility along lines generally in the longitudinal direction with respect to the supported member while remaining relatively rigid along lines generally normal to such longitudinal direction and across the width of the wedge. A boss 16 on the part 15 extends into a corresponding recess 17 on the seat engaging part 18 and a resilient relatively deformable part 19 is carried in the recess 17 beneath the boss 16.

As before, the gripping face part 15 is provided with teeth 20 adapted to engage the supported member 13 with a frictional engagement and bite into the same sufficiently to provide support therefor against the longitudinal movement which the device is intended to prevent. These teeth, as before, are divided from each other by channels 20a so as to render the gripping face part 15 flexible about axes transverse to the direction of longitudinal stress on the member 13.

In operation the form illustrated in FIGS. 3 and 4 is substantially the same as that shown in FIGS. 1 and 2 and heretofore described. The major differences between the two forms are in the shape of the longitudinal member which is supported, the same being of circular cross section in FIGS. 1 and 2 and of square cross section in FIGS. 3 and 4, and in the fact that in FIGS. 1 and 2 a substantially complete annulus of assembled wedge members is employed about the tubular supported member and within the annular supporting seat 1, whereas in FIGS. 3 and 4 a single composite wedge member is disposed between the square cross section elongated supported member 13 and the plane seat surface 1 in the supporting member 2. As before, the distribution of lateral forces or forces transverse to the longitudinal axis of the supported member may be distributed and varied by appropriately designing the width of the relatively resilient member 19 from point to point along its length, as well as designing the recess 17 and the boss 16.

From the foregoing it will be seen that a means has been provided for carrying out and accomplishing all of the objects and advantages sought by this invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A composite wedge for supporting a first member against longitudinal displacement with respect to a second member in the converging direction of a seating surface located in the second member and converging toward the first member, said wedge comprising a gripping face part having one surface contoured to engage and grip the first member for supporting it, and a contoured boss on the opposite surface of varying width along the length of the wedge, said gripping part having means for rendering it flexible along its length, a force distributing part contoured to correspond with the boss on the gripping face part and made of relatively easily deformable material to transmit an equal unit pressure in all directions when confined and under pressure, and a seating surface engaging part having a recess in one face for receiving the force distributing part and the boss on the gripping face part and contoured to correspond thereto, and an opposite surface shaped and disposed to conform with the seating surface in the second member, whereby the force distributing part distributes gripping forces along the length of engagement between the gripping face part and the first member in proportion to the variation in width of the force transmitting area of the force distributing part from point to point along the length of engagement.

2. A composite wedge as set forth in claim 1 in which the gripping face part has a gripping surface of substantially higher frictional characteristics than the tapered seating surface on the seating surface engaging part.

3. A composite wedge as set forth in claim 1 in which the width of the contoured boss on said gripping face party aries from a minimum adjacent one end of the composite wedge to a maximum adjacent the other end thereof.

4. A composite wedge for supporting a first member against longitudinal displacement with respect to a second member in the converging direction of a seating surface located in the second member and converging toward the first member, said wedge comprising a gripping face part having one surface contoured to engage and grip the first member for supporting it against movement in one direction with respect to the second member, a seating surface engaging part radially outwardly from said gripping face part and having a surface shaped and disposed to conform with the seating surface in the second member, and force distributing means interposed between said parts for transmitting force from said seating surface engaging part to various zones of the gripping face part in predetermined ratios varying from one point to another along the length of the wedge.

5. A composite wedge for supporting a first member against longitudinal displacement with respect to a second member in the converging direction of a seating surface located in the second member and converging toward the first member, said wedge comprising a gripping face part having one surface contoured to engage and grip the first member for supporting it against movement in one direction with respect to a second member, a seating surface engaging part radially outwardly from said gripping face part and having a surface shaped and disposed to conform with the seating surface in the second member, and force distributing means interposed between said parts for transmitting force from said seating surface engaging part to various zones of the gripping face part in predetermined ratios varying from one point to another along the length of the wedge, said force distributing means comprising a part contoured to correspond in width from point to point along the length of the wedge with the desired ratio of forces to be transmitted from the seating surface engaging part to the gripping face part and being of a relatively easily deformed material to transmit force equally in all directions when confined and under pressure, said contoured part being confined between said seating surface engaging part and said gripping face part.

6. A composite wedge for supporting a first member against longitudinal displacement with respect to a second member in the converging direction of a seating surface located in the second member and converging toward the first member, said wedge comprising a gripping face part having one surface contoured to engage and grip the first member for supporting it against movement in one direction with respect to the second member, a seating surface engaging part radially outwardly from said gripping face part and having a surface shaped and disposed to conform with the seating surface in the second member, and force distributing means interposed between said parts for transmitting force from said seating surface engaging part to the various zones of the gripping face part in predetermined ratios varying from one point to another along the length of the wedge, said gripping face part and said seating surface engaging part having interfitting telescoping portions providing an enclosed contoured variable volume chamber and a body of force transmitting material in said chamber for applying force equally in all directions, the contour of said chamber varying in width from one end of said wedge to the other in the proportion of the predetermined ratios of desired transmission of forces from said seating surface engaging part to said gripping face part.

7. A composite wedge for supporting a pipe against displacement with respect to a tapered annular seat in which it is disposed in the direction of the convergence of such seat toward the pipe, said wedge comprising a plurality of segments each including a gripping face part having one surface contoured to engage and grip the pipe for supporting it against movement in one direction with respect to the tapered annular seat, a seat engaging part radially outwardly from said gripping face part and having a surface shaped and disposed to conform with the tapered seat, and force distributing means interposed between said parts for transmitting force from said seat engaging part to various zones of the gripping face part in predetermined ratios varying from one point to another along the length of the wedge.

8. A composite wedge for supporting a pipe against displacement with respect to a tapered annular seat in which it is disposed in the direction of the convergence of such seat toward the pipe, said wedge comprising a plurality of segments each including a gripping face part having one surface contoured to engage and grip the pipe for supporting it against movement in one direction with respect to the tapered annular seat, a seat engaging part radially outwardly from said gripping face part and having a surface shaped and disposed to conform with the tapered seat, and force distributing means interposed between said parts for transmitting force from said seat engaging part to various zones of the gripping face part in predetermined ratios varying from one point to another along the length of the wedge, said segments being in number and size such as to approximate a complete annulus in the space between said pipe and said seating surface.

References Cited in the file of this patent

UNITED STATES PATENTS

| | | |
|---|---|---|
| 1,159,096 | Rigby | Nov. 2, 1915 |
| 1,719,533 | Cady | July 2, 1929 |
| 2,583,885 | Russenberger | Jan. 29, 1952 |

FOREIGN PATENTS

| | | |
|---|---|---|
| 806,426 | Germany | Feb. 21, 1952 |